United States Patent
Yonekubo

4,204,748
May 27, 1980

[54] A FOCAL RELAY LENS SYSTEM FOR AN INVERTED MICROSCOPE

[75] Inventor: Ken Yonekubo, Hachiouji, Japan

[73] Assignee: Olympus Optical Company Limited, Tokyo, Japan

[21] Appl. No.: 942,393

[22] Filed: Sep. 14, 1978

Related U.S. Application Data

[63] Continuation of Ser. No. 856,095, Nov. 30, 1977, abandoned.

[30] Foreign Application Priority Data

Dec. 10, 1976 [JP] Japan .............................. 51-148423
Dec. 10, 1976 [JP] Japan .............................. 51-148424

[51] Int. Cl.$^2$ .............................................. G02B 9/12
[52] U.S. Cl. .................................. 350/228; 350/212; 350/54

[58] Field of Search .................... 350/54, 49, 228, 212

[56] References Cited

U.S. PATENT DOCUMENTS

3,202,047  8/1965  Lawler .................................. 350/49
4,047,794  9/1977  Park et al. ............................ 350/54

*Primary Examiner*—Jon W. Henry
*Attorney, Agent, or Firm*—Cushman, Darby & Cushman

[57] ABSTRACT

An afocal relay lens system comprising a first lens group consisting of a positive cemented doublet and a second lens group consisting of a positive cemented doublet and a negative cemented doublet, and being arranged between the contact surface of the revolver and that of the microscope tube. The afocal relay lens system permits prolonging the mechanical tube length without changing the equivalent optical tube length.

4 Claims, 9 Drawing Figures

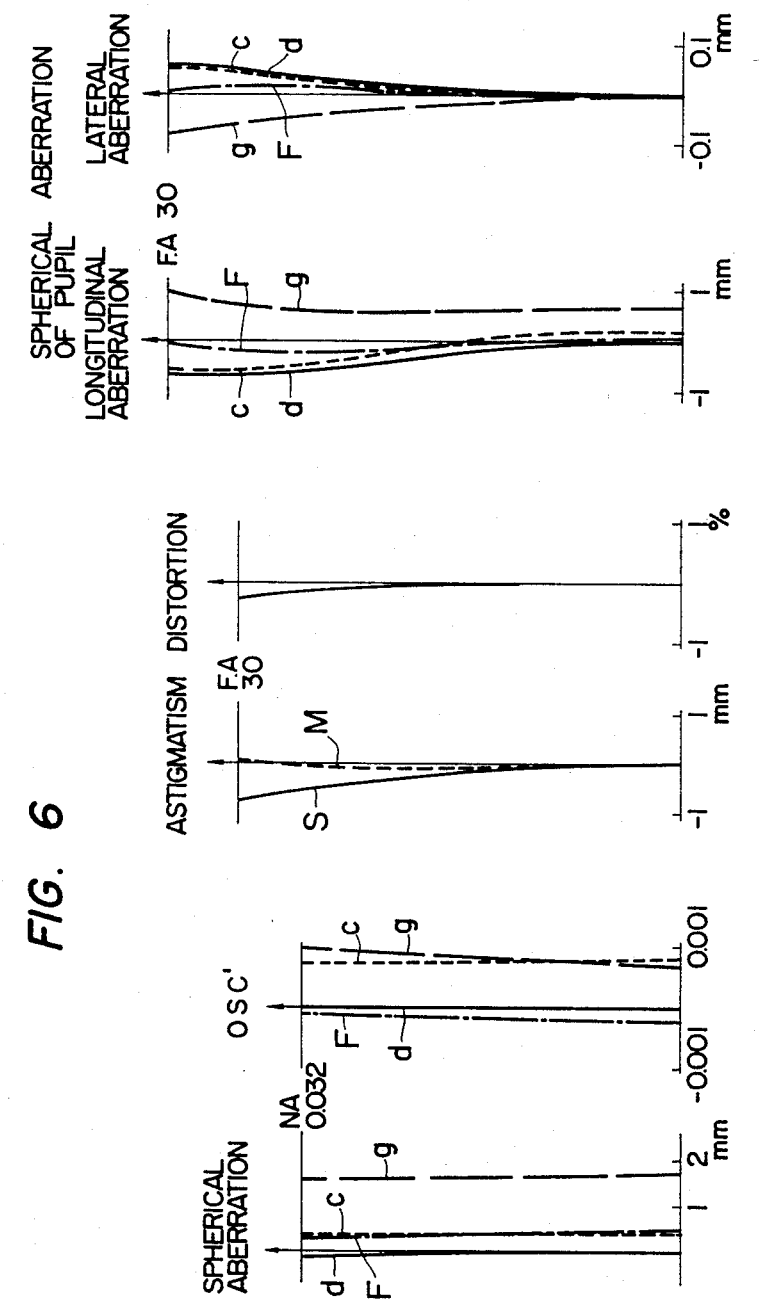

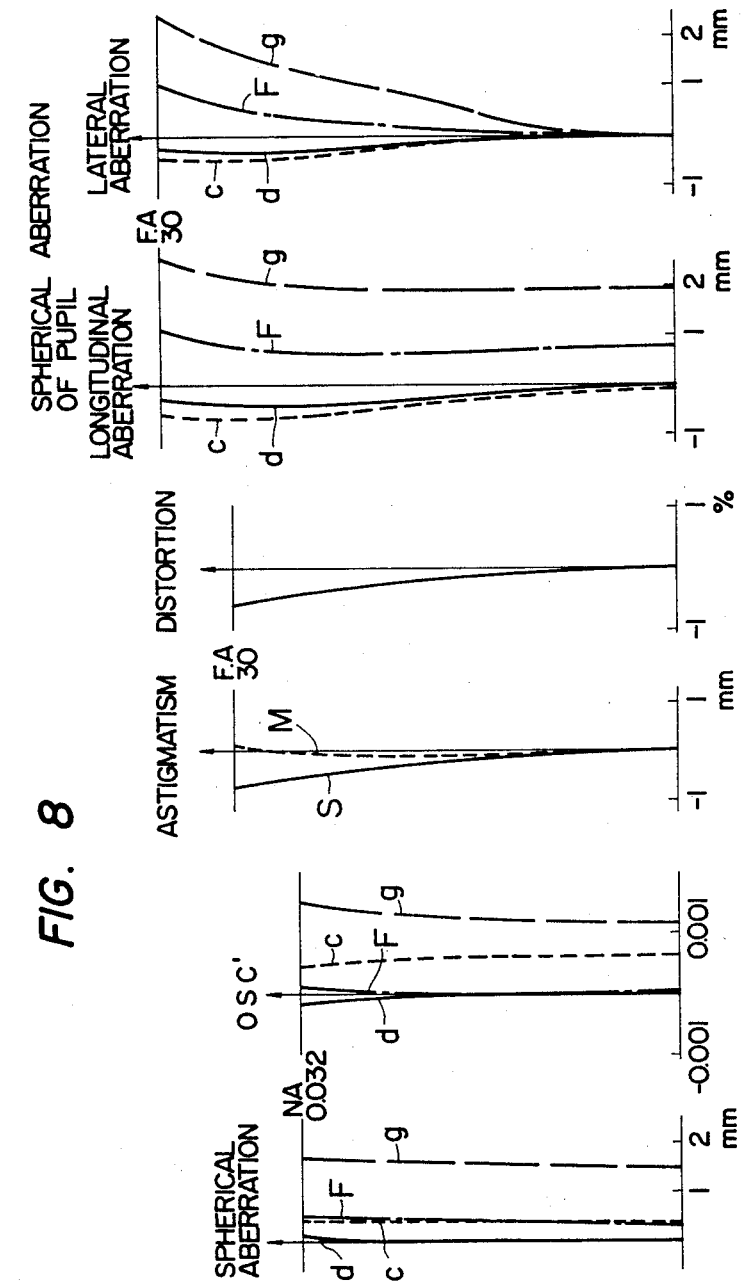

A FOCAL RELAY LENS SYSTEM FOR AN INVERTED MICROSCOPE

This is a continuation, of application Ser. No. 856,095 filed Nov. 30, 1977 now abandoned.

BACKGROUND OF THE INVENTION (a) Field of the Invention

The present invention relates to an inverted type microscope which is suited for observing cells being cultivated in a culture dish, surfacial conditions of metals, minerals and so on.

(b) Description of the Prior Art

When cells 3 being cultivated in a culture dish 1 shown in FIG. 1, for example, are observed through an ordinary type microscope as shown in FIG. 3, remarkable reflection on the surfaces of cover 2 of the culture dish and culture fluid 4 makes it impossible to clearly observe the cells which are located on the bottom of the culture dish. In observing a surface 5a of a metal or mineral specimen 5 as shown in FIG. 2 through an ordinary type microscope, the microscope can be focused only on a portion of the surface 5a if said surface is not perfectly parallel with the surface 5b on the opposite side. In such a case, tedious procedures are required for refocusing the microscope each time for observing a different portion of said surface. For observing such specimens, there have been contrived inverted type microscopes which have objective lenses arranged under the specimen stage for observing through the bottom surface of said specimen stage on the top surface of which specimens such as culture dishes, minerals are to be mounted. However, such inverted tupe microscopes have a common defect that they are low in operability and a micrographing system can hardly be arranged due to the fact that the ocular is positioned lower than the specimen stage for assuring a mechanical tube length equivalent to that of the ordinary type microscopes. This defect can be eliminated by prolonging the mechanical tube length. Speaking concretely with reference to an ordinary type microscope, the mechanical tube length can be prolonged by arranging relay lenses between the contact surface 6a of the revolver 6 and the contact surface 7a of the microscope tube 7 shown in FIG. 3. Since a single negative lens group used as the relay lens system will enhance the image magnification, it is general to design the relay lens system as a combination of positive and negative lenses or negative and positive lenses. However, such a method for prolonging the distance to the image position will inevitably increase the magnification of pupil, prolong the optical tube length, cause eclipse and limit the field number.

Similarly in case of an inverted type microscope, such a relay lens system for prolonging the mechanical tube length will inevitably prolong the optical tube length, thereby making the microscope practically unusable.

SUMMARY OF THE INVENTION

An object of the present invention is to provide an inverted type microscope which comprises an afocal relay lens system consisting of two lens groups between the contact surface of the microscope tube and that of the revolver, thereby having a long mechanical tube length without changing the equivalent optical tube length.

Another object of the present invention is to provide an inverted type microscope in which a filtering element is detachably arranged at the image position of the objective lens pupil formed with the relay lens system.

BRIEF DESCRIPTION OF THE DRAWINGS

FIG. 6 and FIG. 7 show curves illustrating the aberration characteristics of the relay lens system in the Example 1; and FIG. 8 and FIG. 9 show graphs illustrating the aberration characteristics of the relay lens system in the Example 2.

DETAILED DESCRIPTION OF THE PREFERRED EMBODIMENT

Figure 4:
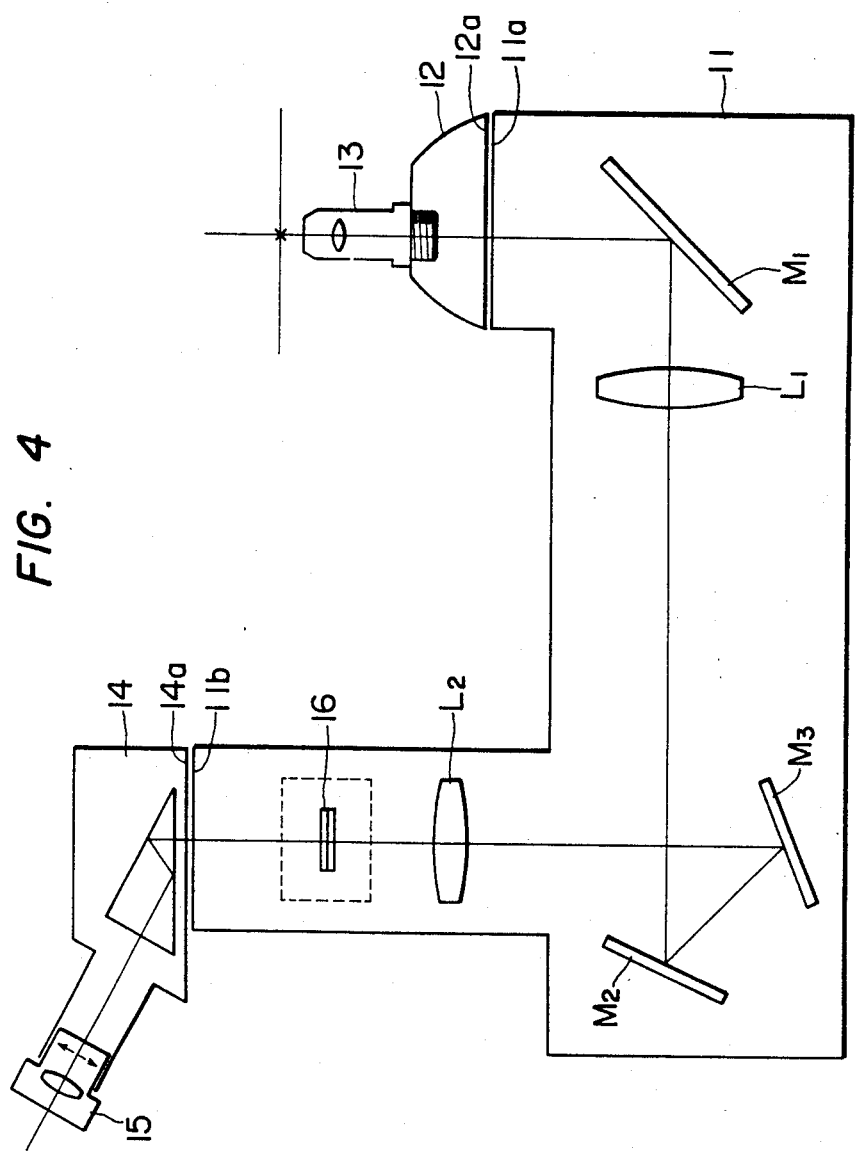
FIG. 4 shows an schematic representation illustrating the construction of the microscope according to the present invention.

In FIG. 4 illustrating the construction of the inverted type microscope according to the present invention, the reference numeral 11 represents a microscope body, the reference numeral 12 denotes a revolver, the reference numeral 13 designates an objective lens, the reference numeral 14 represents a microscope tube and the reference numeral 15 denotes an ocular. As is easily seen from FIG. 4, the inverted type microscope according to the present invention is equipped with the revolver 12 attached to an end surface 11a of the microscope body 11 and the microscope tube 14 attached to the other end surface 11b. Arranged in the microscope body 11 are a first lens group $L_1$ and second lens group $L_2$ as well as three mirrors $M_1$, $M_2$ and $M_3$ which form an optical path in the shape of "U". The lens groups arranged in the microscope body 11 form an afocal lens system, i.e., the lens groups $L_1$ and $L_2$ have a total focal length $f_{12} = \infty$. Further, the lens system is so designed as to satisfy the condition $f_1 = f_2 = L/4$ when the focal lengths of the lens groups $L_1$ and $L_2$ are represented by reference symbols $f_1$ and $f_2$ respectively, and the distance as measured from the end surface 11a to the other end surface 11b of the microscope body, i.e., the contact surface 12a of the revolver to the contact surface 14a of the microscope tube is designated by a reference symbol L. In other words, the lens groups $L_1$ and $L_2$ compose a relay lens system for a magnification of image $-1\times$.

Figure 1:
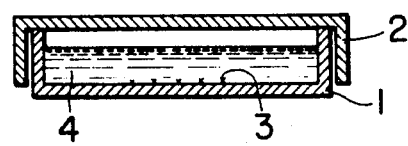
FIG. 1 shows an outline of cells contained in a culture dish as an example of specimen suited for observation with the inverted type microscope.
Figure 2:
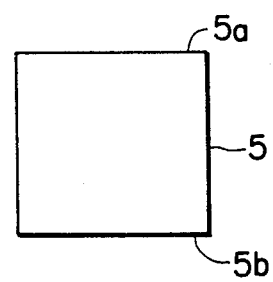
FIG. 2 illustrates an outline of a mineral as an example of specimen suited for observation with the inverted type microscope.
Figure 3:
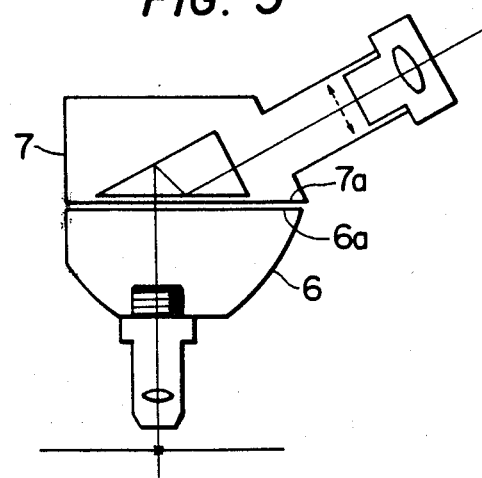
FIG. 3 shows a schematic representation illustrating the construction of an ordinary type microscope.

The inverted type microscope having such a construction as is described above has a magnification of image $-1\times$ and a magnification of pupil $1\times$, and therefore makes it possible to position the ocular above the specimen surface since it permits prolonging the mechanical tube length without changing the equivalent optical tube length. By correcting both the image aberration and pupil aberration in the lens groups composing the afocal system of the inverted type microscope according to the present invention, it is possible to observe specimens with the same performance as that of an ordinary type microscope which is equipped with an intermediate tube containing mirrors, etc. between the contact surface 6a of the revolver and contact surface 7a of the microscope tube as shown in FIG. 3, even when the microscope according to the present invention has an intermediate tube between the surfaces 11a and 12a or between the surfaces 11b and 14a for incident light illumination or other purposes. Further, it is possible to arrange a filtering element 16 such as a phase plate or Nomarski type interference prism detachably at the image position of the objective lens pupil which is projected between the lens group $L_2$ and the contact surface 14a of the microscope tube. The inverted type microscope according to the present invention therefore permits observation using said filtering element and without replacement of objective lenses which is required for the conventional microscopes. In this case also, the microscope according to the present invention can exhibits performance equivalent to that of the ordinary type microscope equipped with a filtering element when both the image aberrations and pupil aberrations are corrected in the lens groups $L_1$ and $L_2$ as already described above.

Figure 5:
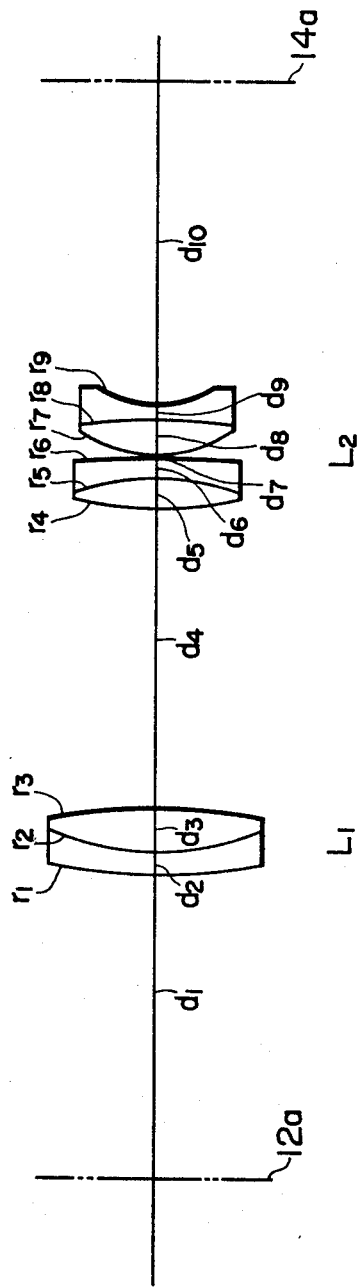
FIG. 5 shows a sectional view illustrating the composition of the relay lens system for use with the microscope according to the present invention.

FIG. 5 exemplifies the construction of a relay lens system for use in the microscope according to the present invention which comprises a first lens group $L_1$ consisting of a positive cemented doublet and a second lens group $L_2$ consisting of a positive cemented doublet and a negative cemented doublet the relay lens system of $L_1$ and $L_2$ is an afocal lens system, so that the whole focal length of the lens $L_1$ and $L_2$ is infinite. The basis of the data given hereinafter is $f_1 = f_2 = 100$. Said relay lens system is characterized by the fact that it satisfies the following conditions:

(1) $n_1 > 1.6$, $\nu_1 < 40$  $1.45 < n_2 < 1.55$, $55 < \nu_2$
(2) $1.5 < n_6 < 1.56$, $55 < \nu_6 < 65$
(3) $0.14 f_2 < r_9 < 0.18 f_2$ wherein the reference symbols represent as defined below:

$n_1$, $n_2$: refractive indices of the respective elements of the first lens group $L_1$ $\nu_1$, $\nu_2$: Abbe's number of the respective elements of the first lens group $L_1$ $n_6$: refractive index of the rearmost element of the second lens group $L_2$ $\nu_6$: Abbe's number of the rearmost element of the second lens group $L_2$ $r_9$: radius of curvature of the rearmost surface of the second lens group $L_2$ $f_2$: total focal length of the second lens group $L_2$ as a whole If $n_1$ is smaller than 1.6 in the condition (1) mentioned above, spherical aberration of pupil will be undercorrected. If $\nu_1$ is larger than 40 in the condition (1), longitudinal chromatic aberration of pupil will be undercorrected and, in addition, lateral chromatic aberration of image will be overcorrected. When $n_2$ is smaller than the lower limit of of the condition (1), spherical aberration of pupil will be overcorrected. If $n_2$ exceeds the upper limit defined by the condition (1), spherical aberration of pupil will be undercorrected. When $\nu_2$ is smaller than 55, longitudinal chromatic aberration of pupil will be undercorrected and, in addition, lateral chromatic aberration of image will be overcorrected.

Speaking with reference to the condition (2), spherical aberration of image will be undercorrected if $n_6$ is smaller than the lower limit, and overcorrected if $n_6$ exceeds the upper limit.

When $\nu_6$ is larger than the upper limit of the condition (2), both longitudinal and lateral chromatic aberrations of image will be undercorrected. If $\nu_6$ is smaller than the lower limit of the condition (2), in contrast, both longitudinal and lateral chromatic aberrations of image will be overcorrected.

When $r_9$ is smaller than $0.14 f_2$ in the condition (3), spherical aberration will be overcorrected and astigmatism will be increased. If $r_9$ exceeds $0.18 f_2$, spherical aberration will be undercorrected and, in addition, curvature of field will be aggravated. Now, some preferred examples of the relay lens system for the microscope according to the present invention will be described below:

EXAMPLE 1

| | | | |
|---|---|---|---|
| $r_1 = 82.319$ | $d_1 = 95.819$ | | |
| $r_2 = 38.391$ | $d_2 = 2.774$ | $n_1 = 1.68893$ | $\nu_1 = 31.08$ |
| $r_3 = -82.918$ | $d_3 = 5.548$ | $n_2 = 1.51633$ | $\nu_2 = 64.15$ |
| $r_4 = 53.021$ | $d_4 = 211.769$ | | |
| $r_5 = -30.961$ | $d_5 = 4.359$ | $n_3 = 1.51633$ | $\nu_3 = 64.15$ |
| $r_6 = -260.173$ | $d_6 = 2.378$ | $n_4 = 1.64769$ | $\nu_4 = 33.80$ |
| $r_7 = 20.004$ | $d_7 = 0.396$ | | |
| $r_8 = -185.609$ | $d_8 = 4.359$ | $n_5 = 1.62230$ | $\nu_5 = 53.20$ |
| $r_9 = 15.269$ | $d_9 = 2.378$ | $n_6 = 1.53996$ | $\nu_6 = 59.57$ |

$d_{10} = 81.633$
($\Sigma d = 411.413$)
$f_1 = 100.0$, $HH_1' = 2.932$
$f_2 = 100.0$, $HH_2' = 8.481$
$$\frac{\Sigma d - HH_1' - HH_2'}{4} = 100.0$$

Distance as measured from the contact surface 12a of the revolver to the image of the objective lens: 84,802

EXAMPLE 2

| | | | |
|---|---|---|---|
| $r_1 = 86.711$ | $d_1 = 97.726$ | | |
| $r_2 = 39.276$ | $d_2 = 2.689$ | $n_1 = 1.68893$ | $\nu_1 = 31.08$ |
| $r_3 = -66.872$ | $d_3 = 5.762$ | $n_2 = 1.48749$ | $\nu_2 = 70.15$ |
| $r_4 = 48.194$ | $d_4 = 213.430$ | | |
| $r_5 = -32.508$ | $d_5 = 4.556$ | $n_3 = 1.51633$ | $\nu_3 = 64.15$ |
| $r_6 = -296.368$ | $d_6 = 2.420$ | $n_4 = 1.64769$ | $\nu_4 = 33.8$ |
| $r_7 = 24.488$ | $d_7 = 0.668$ | | |
| $r_8 = -68.460$ | $d_8 = 5.232$ | $n_5 = 1.62230$ | $\nu_5 = 53.2$ |
| $r_9 = 17.498$ | $d_9 = 2.896$ | $n_6 = 1.53996$ | $\nu_6 = 59.57$ |

$d_{10} = 77.136$
($\Sigma d = 412.515$)
$f_1 = 100.0$, $HH_1' = 2.881$
$f_2 = 100.0$, $HH_2' = 9.634$
$$\frac{\Sigma d - HH_1' - HH_2'}{4} = 100.0$$

Distance as measured from the contact surface 12a of the revolver to the image of the objective lens: 82.206

In the examples introduced above, the reference symbols $r_1$ through $r_9$ represent radii of curvature of the respective lens surfaces, the reference symbols $d_1$ through $d_{10}$ designate the thicknesses of the lenses and airspaces arranged between the contact surface 12a of the revolver and contact surface 14a of the microscope tube, the reference symbols $n_1$ through $n_6$ denote refractive indices of the respective lens elements, the reference symbols $\nu_1$ through $\nu_6$ represent the Abbe's numbers of the respective lens elements, the reference symbols $f_1$ and $f_2$ designate the focal length of the first and second lens groups, and the reference symbols $HH'_1$ and $HH'_2$ denote the distance as measured from the principal point of the first lens group to that of the second lens group.

The aberration characteristics of the examples are illustrated in FIG. 6 through FIG. 9. FIG. 6 shows the aberration characteristics of image in the Example 1, FIG. 7 visualizes the aberration characteristics of pupil in the Example 1, FIG. 8 illustrates the aberration characteristics of image in the Example 2, and FIG. 9 shows the aberration characteristics of pupil in the Example 2.

Further, the relay lens system described in the foregoing is not limited for use with an inverted type microscope, but is usable with microscopes of general types for the purpose of prolonging the mechanical tube length.

I claim:

1. An afocal relay lens system comprising a first lens group consisting of a positive cemented doublet and a second lens group consisting of a positive cemented doublet and a negative cemented doublet, said afocal relay lens system being arranged for positioning between the contact surface of a revolver and that of a microscope tube, and said afocal relay lens system satisfying the following conditions:

(1) $1.45 < n_2 < 1.55$, $55 < \nu_2 < 71$
   (2) $1.5 < n_6 < 1.56$, $55 < \nu_6 < 65$
   (3) $0.14 f_2 < r_9 < 0.18 f_2$ wherein the reference symbols $n_2$ and $n_6$ represent the refractive indices of the rear element of the first lens group and the rearmost element of the second lens group, the reference symbols $\nu_2$ and $\nu_6$ designate the Abbe's numbers of the rear element of the first lens group and the rearmost element of the second lens group, the reference symbol $r_9$ denotes the radius of curvature on the rearmost surface of the second lens group and the reference symbol $f_2$ represents the total focal length of the second lens group as a whole.

2. An afocal relay lens system according to claim 1 having the following numerical data

| | | | |
|---|---|---|---|
| $r_1 = 82.319$ | $d_1 = 95.819$ | | |
| $r_2 = 38.391$ | $d_2 = 2.774$ | $n_1 = 1.68893$ | $\nu_1 = 31.08$ |
| $r_3 = -82.918$ | $d_3 = 5.548$ | $n_2 = 1.51633$ | $\nu_2 = 64.15$ |
| $r_4 = 53.021$ | $d_4 = 211.769$ | | |
| $r_5 = -30.961$ | $d_5 = 4.359$ | $n_3 = 1.51633$ | $\nu_3 = 64.15$ |
| $r_6 = -260.173$ | $d_6 = 2.378$ | $n_4 = 1.64769$ | $\nu_4 = 33.80$ |
| $r_7 = 20.004$ | $d_7 = 0.396$ | | |
| $r_8 = -185.609$ | $d_8 = 4.359$ | $n_5 = 1.62230$ | $\nu_5 = 53.20$ |
| $r_9 = 15.269$ | $d_9 = 2.378$ | $n_6 = 1.53996$ | $\nu_6 = 59.57$ |
| | $d_{10} = 81.633$ | | |
| | ($\Sigma d = 411.413$) | | |

$f_1 = 100.0$, $HH'_1 = 2.932$
$f_2 = 100.0$, $HH'_2 = 8.481$ $$\frac{\Sigma d - HH'_1 - HH'_2}{4} = 100.0$$

Distance as measured from the contact surface 12a of the revolver to the image of the objective lens: 84,802
   wherein the reference symbols $r_1$ through $r_9$ represent radii of curvature of the respective lens surfaces, the reference symbols $d_1$ through $d_{10}$ designate the thicknesses of the lenses and airspaces arranged between the contact surface 12a of the revolver and contact surface 14a of the microscope tube, the reference symbols $n_1$ through $n_6$ denote refractive indices of the respective lens elements, the reference symbols $\nu_1$ through $\nu_6$ represent the Abbe's numbers of the respective lens elements, the reference symbols $f_1$ and $f_2$ designate the focal length of the first and second lens groups, and the reference symbols $HH'_1$ and $HH'_2$ denote the distance as measured from the principal point of the first lens group to that of the second lens group.

3. An afocal relay lens system according to claim 1 having the following numerical data

| | | | |
|---|---|---|---|
| $r_1 = 86.711$ | $d_1 = 97.726$ | | |
| $r_2 = 39.276$ | $d_2 = 2.689$ | $n_1 = 1.68893$ | $\nu_1 = 31.08$ |
| $r_3 = -66.872$ | $d_3 = 5.762$ | $n_2 = 1.48749$ | $\nu_2 = 70.15$ |
| $r_4 = 48.194$ | $d_4 = 213.430$ | | |
| $r_5 = -32.508$ | $d_5 = 4.556$ | $n_3 = 1.51633$ | $\nu_3 = 64.15$ |
| $r_6 = -296.368$ | $d_6 = 2.420$ | $n_4 = 1.64769$ | $\nu_4 = 33.8$ |
| $r_7 = 24.488$ | $d_7 = 0.668$ | | |
| $r_8 = -68.460$ | $d_8 = 5.232$ | $n_5 = 1.62230$ | $\nu_5 = 53.2$ |
| $r_9 = 17.498$ | $d_9 = 2.896$ | $n_6 = 1.53996$ | $\nu_6 = 59.57$ |
| | $d_{10} = 77.136$ | | |
| | ($\Sigma d = 412.515$) | | |

$f_1 = 100.0$, $HH'_1 = 2.881$
$f_2 = 100.0$, $HH'_2 = 9.634$ $$\frac{\Sigma d - HH'_1 - HH'_2}{4} = 100.0$$

Distance as measured from the contact surface 12a of the revolver to the image of the objective lens: 82.206
   wherein the reference symbols $r_1$ through $r_9$ represent radii of curvature of the respective lens surfaces, the reference symbols $d_1$ through $d_{10}$ designate the thicknesses of the lenses and airspaces arranged between the contact surface 12a of the revolver and contact surface 14a of the microscope tube, the reference symbols $n_1$ through $n_6$ denote refractive indices of the respective lens elements, the reference symbols $\nu_1$ through $\nu_6$ represent the Abbe's numbers of the respective lens elements, the reference symbols $f_1$ and $f_2$ designate the focal length of the first and second lens groups, and the reference symbols $HH'_1$ and $HH'_2$ denote the distance as measured from the principal point of the first lens group to that of the second lens group.

4. An afocal relay lens system according to claim 1, in which the refractive index $n_1$ and Abbe's number $\nu_1$ of the front lens element of the first lens group respectively have the following numerical values:
   $n_1 = 1.68893$
   $\nu_1 = 31.08$.

* * * * *